United States Patent [19]

Watanabe

[11] Patent Number: 5,217,283
[45] Date of Patent: Jun. 8, 1993

[54] INTEGRAL ANTI-LOCK BRAKE/TRACTION CONTROL SYSTEM

[75] Inventor: Shunso F. Watanabe, Livonia, Mich.

[73] Assignee: Ford Motor Company, Dearborn, Mich.

[21] Appl. No.: 765,613

[22] Filed: Sep. 25, 1991

[51] Int. Cl.⁵ .......................... B60T 8/34; B60T 8/44
[52] U.S. Cl. .............................. 303/113.2; 303/114.1; 303/115.2; 303/116.1
[58] Field of Search ...... 303/113 TR, 114 R, 115 EC, 303/113 R, 114 TB, 119 SV, 115 PP, 116 R, 113.2, 114.1, 115.2, 113.1, 113.3, 119.2, 115.4, 116.1

[56] References Cited

U.S. PATENT DOCUMENTS

| | | | |
|---|---|---|---|
| 3,845,992 | 11/1974 | Takayama | 303/114 R |
| 3,874,742 | 4/1975 | Takayama | 303/114 R |
| 4,032,197 | 6/1977 | Kohler | 303/20 |
| 4,156,547 | 5/1979 | Marsh | 303/96 |
| 4,310,201 | 1/1982 | Pauwels | 303/110 |
| 4,565,411 | 1/1986 | Seiber | 303/110 |
| 4,583,611 | 4/1986 | Frank et al. | 180/197 |
| 4,641,895 | 2/1987 | Belart et al. | 303/110 |
| 4,643,485 | 2/1987 | Leiber | 303/96 |
| 4,743,075 | 5/1988 | Belart et al. | 303/110 |
| 4,755,008 | 7/1988 | Imoto et al. | 303/100 |
| 4,765,691 | 8/1988 | Inoue et al. | 303/113.2 |
| 4,778,224 | 10/1988 | Leiber | 303/113.3 |
| 4,794,538 | 12/1988 | Cao et al. | 303/95 |
| 4,802,562 | 2/1989 | Kuroyanagi et al. | 303/20 |
| 4,807,943 | 2/1989 | Ogino | 303/113.2 |
| 4,818,039 | 4/1989 | Bertling et al. | 303/113.2 |
| 4,838,622 | 6/1989 | Kircher et al. | 303/113 TR |
| 4,950,028 | 8/1990 | Harrison | 303/113 TR |
| 5,029,950 | 7/1991 | Vennemeyer et al. | 303/115 EC |
| 5,042,885 | 8/1991 | Villec | 303/115 EC |
| 5,102,206 | 4/1992 | Vennemeyer et al. | 303/113 TR |

Primary Examiner—Robert J. Oberleitner
Assistant Examiner—Peter M. Poon
Attorney, Agent, or Firm—Raymond L. Coppiellie; Roger L. May

[57] ABSTRACT

An integral anti-lock brake and traction control system for a vehicle which may be operated in either of two modes is provided. A pressure control valve, which includes a first pressure feedback valve and a second pressure feedback valve, regulates brake pressure of the vehicle with the first pressure feedback valve and controls traction of the vehicle with the second pressure feedback valve. A linear motor acts on the pressure feedback valves to provide a brake pressure proportional or inversely proportional to an analog or pulse width modulated voltage. In the braking control mode, brake fluid pressure to a brake cylinder is reduced through operation of the first pressure feedback valve in response to the sensing of the approach of wheel lockup. In the traction control mode, the second pressure feedback valve is shifted by the linear motor to provide pressure proportional to the linear motor force to the brake cylinder to slow the wheel rotation speed and control wheel spin.

9 Claims, 3 Drawing Sheets

INTEGRAL ANTI-LOCK BRAKE/TRACTION CONTROL SYSTEM

BACKGROUND OF THE INVENTION

The present invention relates to an integral anti-lock brake and traction control system, and, more particularly, to a system which is operable in a first mode as an anti-lock brake control system and in a second mode as a traction control system. Conventional systems for preventing a wheel of a motor vehicle from locking during braking or from spinning from loss of traction are known. One such braking system is a system which controls brake fluid pressure applied to a wheel cylinder of a brake device based on a rotation status of the wheel relative, to a threshold value when the brake is operated. Another system prevents a driving wheel of a vehicle from slipping by controlling a brake force caused by a brake fluid pressure in a wheel cylinder of a brake device of the driving wheel based on a slipping status relative to a threshold value when the vehicle starts to move and accelerates.

These conventional systems have a problem in that they tend to be complicated, large-sized and, therefore, expensive. In addition, prior systems have slow response time. Although some problems may be alleviated by integrating the anti-lock brake control system and the traction control system of a vehicle, previous attempts at such integration have added both complications and costs.

Accordingly, there remains a need for an integrated brake and traction control system which provides a fast response time and is economical.

SUMMARY OF THE INVENTION

The present invention meets this need by providing an electro-hydro-mechanical integrated anti-lock brake and traction control assembly wherein a linear motor acts on a pressure control valve to provide brake pressure proportional to the voltage signal supplied to the motor. The mode of operation, either anti-lock brake system control or traction control, is selected by simply changing the polarity on the linear motor.

In accordance with one aspect of the present invention an integral anti-lock brake and traction control system for a vehicle is provided which includes a pressure control valve including a first pressure feedback valve associated with a braking control system and a second pressure feedback valve associated with a traction control system. In a first mode, means responsive to a control voltage, such as a linear motor, are provided which activate the first pressure feedback valve to regulate brake pressure in the braking control system proportionally to the control voltage which is supplied. In a second mode, the means responsive to the control voltage activates the second pressure feedback valve to control vehicle traction in the traction control system. The modes are selected by simply changing the polarity of the control voltage signal.

In another embodiment of the invention, an integral anti-lock brake and traction control system for a wheeled vehicle is provided and includes a braking control system and a traction control system cooperating with the braking control system for controlling the rotational speed of the vehicle wheels. The braking control system comprises braking means operatively associated with the vehicle wheels for retarding the rotation of the wheels. The braking means include a brake cylinder and a source of brake fluid under pressure. The integral system also includes means for sensing the speed of the wheels relative to the synchronous speed of the vehicle and generating a control voltage responsive thereto. By synchronous speed, it is meant that the rotational speed of the wheels match the linear speed of the vehicle. To control vehicle braking and traction integrally, means responsive to the control voltage, such as a pressure control valve, are provided for modulating the pressure of the brake fluid in the brake cylinder.

An advantage of the present invention is that the traction control mode and the anti-lock brake system control mode of the wheel brakes are separate, without one imposing a performance limitation on the other, and a failure in any part of the control system does not impair the manually operated, foundation brakes. The anti-lock brake system and traction control modes are selected by changing the polarity on a linear motor. The linear motor acting on the pressure feedback valve is utilized to provide a brake pressure proportional or inversely proportional to an analog or pulse modulated voltage.

Accordingly, it is an object of the present invention to provide an integrated brake and traction control system which provides a fast response time and is economical. Other objects and advantages of the invention will be apparent from the following detailed description, the accompanying drawings, and the appended claims.

DETAILED DESCRIPTION OF THE PREFERRED EMBODIMENT

The present invention relates to an integral anti-lock brake and traction control system for a vehicle. While described with reference to a single wheel and brake cylinder for simplicity, it will be apparent to those skilled in the art that the system of the present invention is applicable for use in wheeled vehicles having driven pairs of wheels joined through a common axle. A pressure control valve which includes a pair of pressure feedback valves, regulates brake pressure applied to the wheels of the vehicle. A linear motor acts on the pressure feedback valves to provide a brake control pressure proportionally related to the voltage applied to the linear motor.

Figure 1:
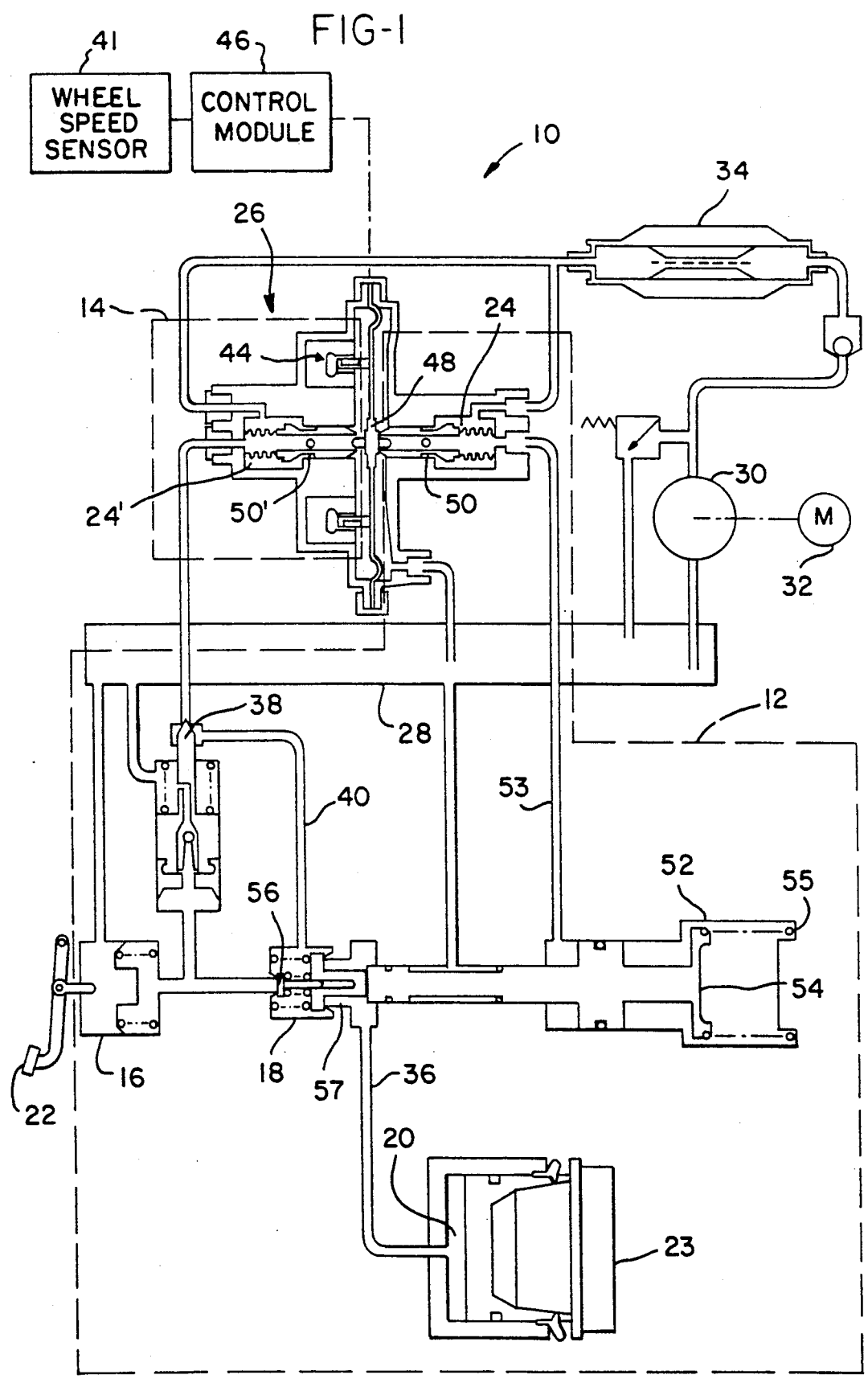
FIG. 1 is a simplified schematic diagram of the integral anti-lock brake system control actuator assembly of the present invention.

Referring now to FIG. 1, the integral system is indicated generally by reference numeral 10 and comprises an anti-lock braking control system (ABS) 12 and traction control system 14 for a vehicle as illustrated. These two systems operate separately and independently in that neither imposes a performance limitation on the other. However, the two systems 12 and 14 share common elements.

For example, the two systems include a master cylinder 16 containing brake fluid for operation, a double check valve 18, and a wheel brake cylinder 20 operated by an input means which is preferably a foot-operated vehicle brake pedal 22. The brake cylinder 20 and brake pedal 22 communicate with a means 23 for vehicle braking, for example a disk brake mechanism. The integral system 10 also includes a sump 28 which operates as a reservoir for vehicle brake fluid. In addition, the system 10 includes a pump 30 and associated motor 32 for generating fluid power and pressurizing the brake fluid. Accumulator 34 is a source of brake fluid under pressure and functions to store the fluid at high pressure. Finally, a wheel speed sensor 41 in conjunction with a control module 46 determines wheel speed relative to the speed of the vehicle. The control module 46 then activates a moving coil linear motor 44 by the application of an analog or pulse width modulated voltage to control braking or traction as explained in greater detail below.

Figure 2:
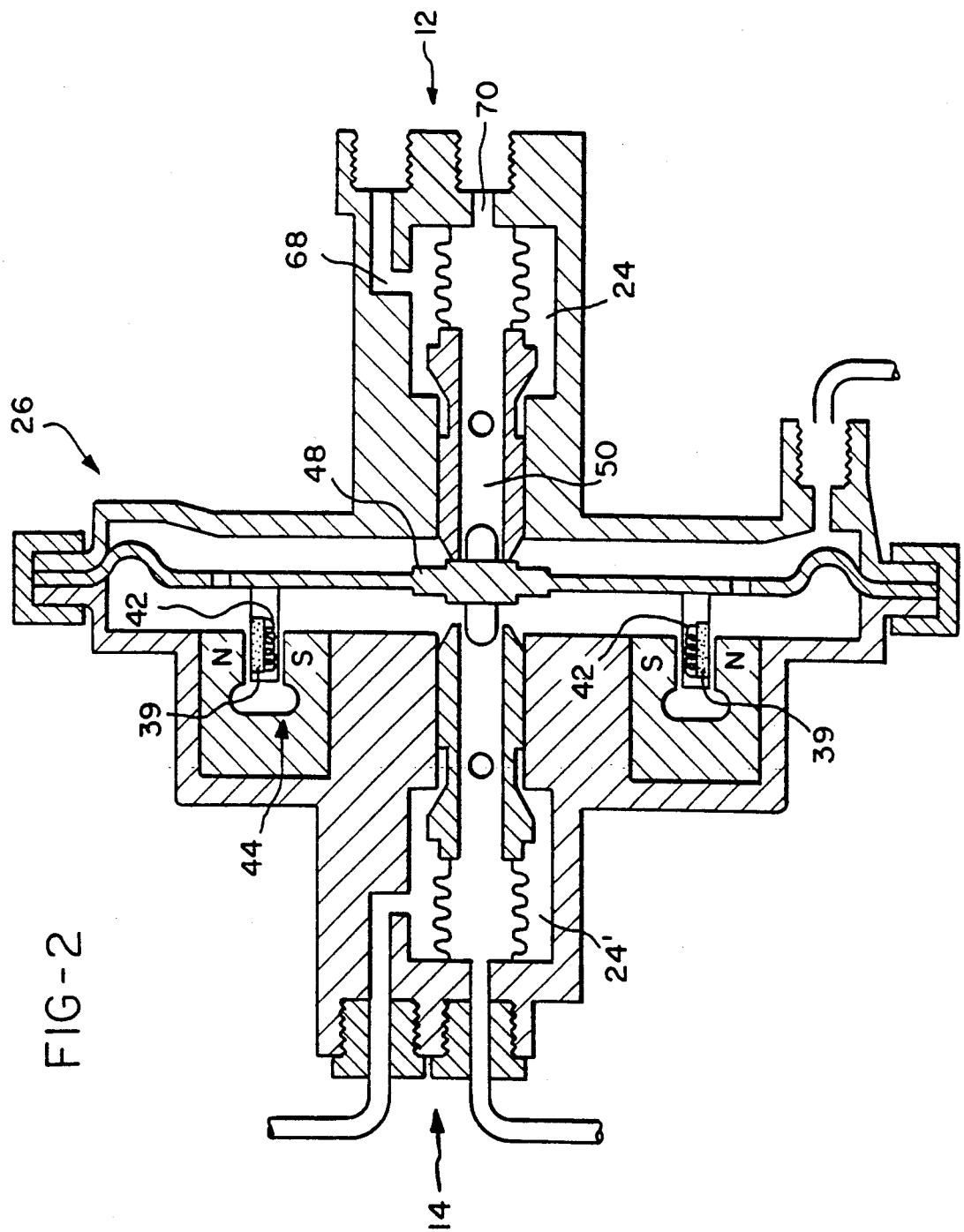
FIG. 2 is a simplified schematic diagram of a portion of the integral antilock brake control and traction control system.

Referring now to FIG. 2, additional elements of the braking control system 12 and traction control system 14 are illustrated. Pressure control valve 26 includes a first pressure feedback valve 24 and a second pressure feedback valve 24'. Control valve 26 regulates the brake pressure in the vehicle and controls both braking and traction for the vehicle. A linear motor 44 acts on pressure control valve 26 to provide brake fluid pressure which is proportional to the voltage applied to coils 42 of linear motor 44. Linear motor 44 includes two stationary magnets 39 and respective moving coils 42. A flapper or hinge valve 48 adjusts the pressure in pressure control valve 26 until the pressure in flapper 48 is equalized by the force of linear motor 44.

Referring back to FIG. 1, when the integral braking and traction control system 10 is operating in a braking control mode, brake fluid passes from the master cylinder 16 past a first poppet valve portion 56 of double check valve 18 and past a second poppet portion 57 which is held open by piston member 54, to wheel brake cylinder 20, via a wheel brake cylinder port 36. A traction control lockout valve 38 is lifted by the brake fluid pressure to close passage 40 to the traction control system 14 portion of the integral system 10, thereby isolating the traction control system 14 such that integral system 10 operates only in the braking control mode.

When excessive force is applied by an operator to the brake pedal 22 causing the braked road wheel to approach lock-up as sensed by a wheel speed sensor 41, control module 46 activates pressure control valve 26 by causing a dc voltage to be applied to coils 42 of linear motor 44 to shift pressure control valve 26 to a position which admits brake fluid to a chamber 50. For illustrative purposes, this movement is depicted as being to the right in the drawings. However, all references in the drawings to a direction (i.e., left, right, up, or down) are for convenience only in understanding the invention as drawn. No limitation is intended to the scope of the invention.

A flapper 48 moves first pressure feedback valve 24 to the right, admitting fluid pressure to chamber 50, and simultaneously to an anti-lock brake system (ABS) actuator 52, through fluid conduit 53, and back against flapper 48. Pressure rises in the anti-lock brake system actuator 52 until the pressure force against flapper 48 is equalized by voltage (force) applied to linear motor 44. Thus, pressure in antilock brake system 12 is proportional to the signal voltage, either analog or pulse width modulated voltage, applied to the linear motor 44.

A piston 54 in the anti-lock brake system actuator 52 is displaced to the right by the pressure of the brake fluid, thereby allowing second poppet portion 57 of double check valve 18 to close. This isolates brake cylinder 20 from the brake fluid supply and allows the pressure in brake cylinder 20, and consequently the braking effort, to drop until wheel spin up of the vehicle occurs. When the wheel spins up, as sensed by the wheel speed sensor 41, and approaches but does not equal the synchronous speed with the vehicle, control module 46 reduces the voltage applied to the coils 42. This acts to reduce the pressure in the brake system actuator 52 so that the excess force of caged spring 55 over that of the opposing pressure force of the fluid urges piston 54 to the left, reopening second poppet portion 57 of double check valve 18 and exposing brake cylinder 20 to additional brake fluid pressure. This increases the braking force applied to the wheel. When the braked road wheel spins down approaching lock as sensed by wheel speed sensor 41, control module 46 again increases the voltage applied to coils 42 to reduce the pressure in the brake cylinder 20 as previously described. If movement of the piston 54 to the left does not cause the braked road wheel to spin down as sensed by wheel speed sensor 41, control module 46 continues to reduce the voltage on coils 42 until piston 54 unseats second poppet portion 57 in double check valve 18 and direct, manual control of the brake is restored.

Continuing with reference to FIG. 1, the integral ABS and traction control actuator assembly 10 operates as a traction control system when a wheel spins faster than its synchronous speed with the vehicle in the accelerating direction. This is a condition which commonly occurs when one driving wheel of a pair is located on a poorer tractive road surface than the other. Traction control system 14 includes second pressure feedback valve 24' which admits fluid under pressure to chamber 50' when second pressure feedback valve 24' is shifted to the left by the action of linear motor 44 and coils 42. Pressure proportional to the voltage applied to linear motor 44 by control module 46 is applied to wheel brake cylinder 20 to control the wheel rotation speed sensed by the wheel speed sensor 41. From chamber 50', the brake fluid under pressure passes through fluid passage 40, double check valve 18, and cylinder port 36 to apply fluid pressure to brake cylinder 20. This develops a reactive wheel torque which enables the second wheel of an axle pair to develop a larger driving torque with the road surface. A poppet valve 56 in the double check valve 18 isolates the master cylinder 16 so that brake fluid under pressure is not circulated to the master cylinder in this mode.

Figure 3:
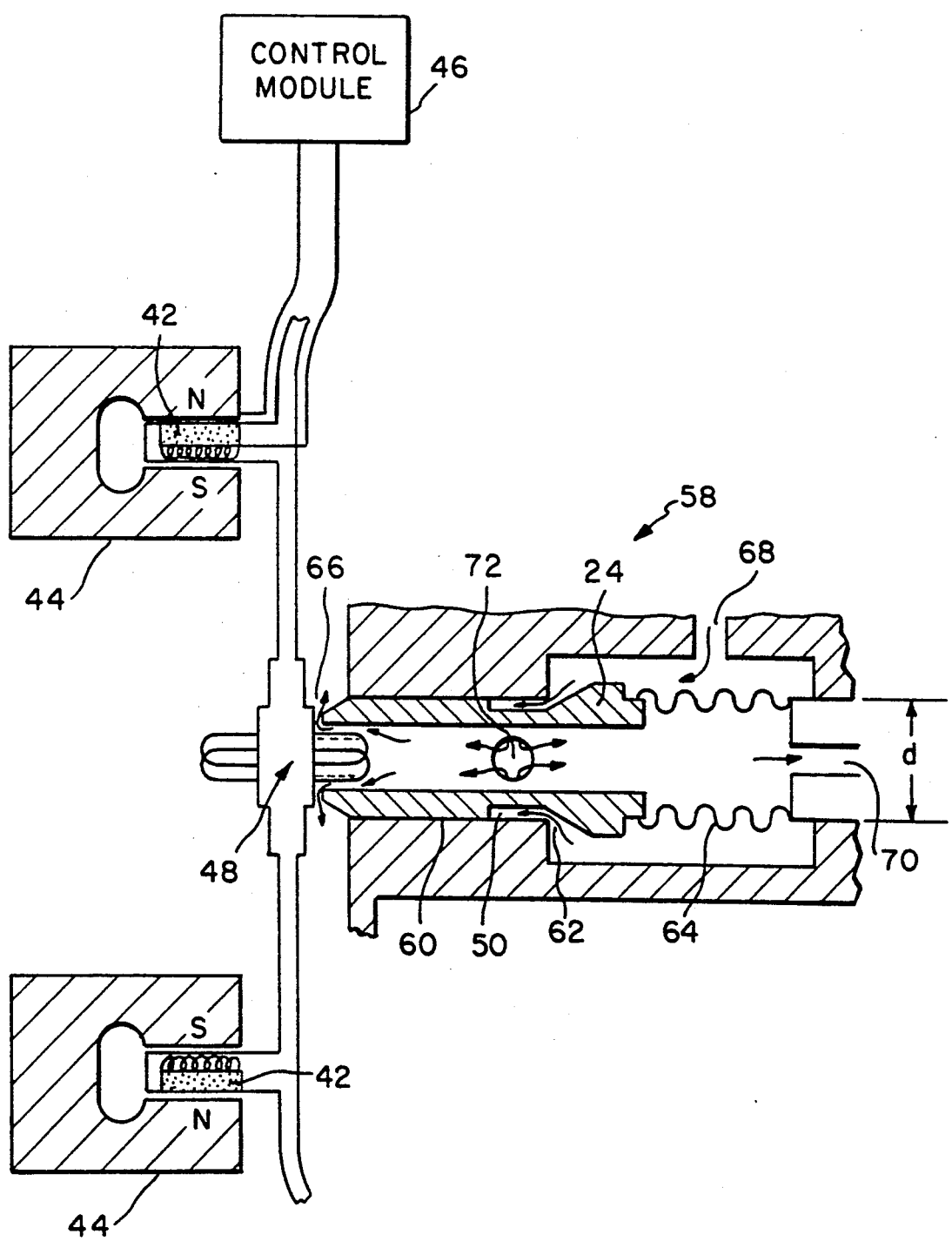
FIG. 3 is a simplified schematic of a portion of the means for modulating the pressure of the brake fluid in the system.

Referring now to FIG. 3, first pressure feedback valve 24 is shown as a portion of a pressure modulator 58 which is responsive to the braking control system 12 and the traction control system 14 for integrally controlling vehicle braking and traction. The diameter of bore 60, the touch diameter of metering seat 62, and bellows neutral force diameter 64, are all equal to the same diameter, d. When a force is applied to the right by flapper 48 against flapper seat 66, first pressure feedback valve 24 is shifted to admit fluid into chamber 50 from a pressure inlet port 68. The chamber 50 is connected to outlet port 70 and flapper 48 through aperture 72.

The fluid pressure force in the axial chamber connecting to port 70 acting against flapper 48 shifts the flapper 48 to the left, allowing the pressure feedback valve 24 to shift to the left, closing metering seat 62 until a force equilibrium is obtained between the force acting on flapper 48 and the pressure in chamber 50. Hence, pressure at outlet port 70 (which in turn communicates with ABS actuator 52 through fluid conduit 53) is proportional to the force on flapper 48. This pressure, in turn, is proportional to the signal voltage applied to linear motor 44. This pressure modulator construction obviates the need to measure the pressure and to control the linear force motor through more complex means.

Having described the invention in detail and by way of reference to preferred embodiments thereof, it will be apparent that modifications and variations are possible without departing from the scope of the invention which is defined in the appended claims.

What is claimed is:

1. An integral anti-lock brake and traction control system for a vehicle comprising:
    a pressure control valve including a flapper valve, a first pressure feedback valve associated with a braking control system, and a second pressure feedback valve associated with a traction control system; and
    means responsive to a control voltage for activating said flapper valve to open either said first pressure feedback valve to regulate brake pressure in said braking control system proportionally to said voltage in a first mode, or said second pressure feedback valve to control vehicle traction in said traction control system in a second mode, wherein said first pressure feedback valve and said second pressure feedback valve are movable in response to direct force applied by said flapper valve.

2. An integral anti-lock brake and traction control system as claimed in claim 1 in which said means responsive to said control voltage comprises a linear motor.

3. An integral anti-lock brake and traction control system as claimed in claim 1 including means for sensing the speed of at least one wheel of said vehicle and means for generating a control voltage responsive to said sensing means.

4. An integral anti-lock brake and traction control system as claimed in claim 3 in which said anti-lock brake and traction control system is changed from said first mode to said second mode by changing the polarity of said control voltage.

5. An integral anti-lock brake and traction control system for a wheeled vehicle comprising:
    a braking control system comprising braking means operatively associated wit the vehicle wheels for retarding the rotation of said wheels, said braking means including a brake cylinder and a source of brake fluid under pressure, a traction control system cooperating with said braking control system for controlling the rotational speed of said vehicle wheels;
    means for sensing the speed of said wheels relative to the synchronous speed of said vehicle and generating a control voltage responsive thereto; and
    means responsive to said control voltage for modulating the pressure of said brake fluid in said brake cylinder to integrally control vehicle braking and traction, said means including a pressure control valve, said pressure control valve including a flapper valve between two opposing pressure feedback valves, with said feedback valves being movable in response to direct force applied by said flapper valve.

6. The integral anti-lock brake and traction control system of claim 5 wherein said pressure control valve comprises a first pressure feedback valve associated with a braking control system and a second pressure feedback valve associated with a traction control system.

7. The integral anti-lock brake and traction control system of claim 6 wherein said means responsive to said control voltage comprises a linear motor.

8. The integral anti-lock brake and traction control system of claim 7 wherein said linear motor moves a centrally-located flapper in a first direction to activate said braking control system and in a second direction to activate said traction control system.

9. The integral anti-lock brake and traction control system of claim 5 wherein said braking control system further includes a braking control actuator responsive to said means for modulating the pressure of said brake fluid, said braking control actuator comprising a spring-biased piston and check valve for isolating said brake cylinder.

* * * * *